(12) United States Patent
Maehara et al.

(10) Patent No.: US 12,511,884 B2
(45) Date of Patent: Dec. 30, 2025

(54) EXCREMENT DETERMINATION METHOD, EXCREMENT DETERMINATION DEVICE, AND NON-TRANSITORY COMPUTER READABLE RECORDING MEDIUM

(71) Applicant: PANASONIC HOLDINGS CORPORATION, Osaka (JP)

(72) Inventors: Hideyuki Maehara, Osaka (JP); Yuka Yamada, Nara (JP); Hirofumi Kanai, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 322 days.

(21) Appl. No.: 18/204,043

(22) Filed: May 31, 2023

(65) Prior Publication Data

US 2023/0306724 A1    Sep. 28, 2023

Related U.S. Application Data

(63) Continuation of application No. PCT/JP2021/040776, filed on Nov. 5, 2021.
(Continued)

(30) Foreign Application Priority Data

Sep. 9, 2021    (JP) .................. 2021-147014

(51) Int. Cl.
  *G06T 7/90*      (2017.01)
  *G06V 10/776*    (2022.01)
  *G06V 20/52*     (2022.01)
(52) U.S. Cl.
  CPC .............. *G06V 10/776* (2022.01); *G06T 7/90* (2017.01); *G06V 20/52* (2022.01); *G06T 2207/10024* (2013.01); *G06T 2207/30232* (2013.01)

(58) Field of Classification Search
  CPC ........ G06V 10/776; G06V 20/52; G06T 7/90; G06T 2207/10024; G06T 2207/30232; A61B 5/00; E03D 9/00; G01N 33/483
(Continued)

(56) References Cited

U.S. PATENT DOCUMENTS 10,507,010 B1 * 12/2019 Kim .................. A61B 5/6889
2018/0010322 A1 * 1/2018 Grover .................. G01S 15/88
(Continued)

FOREIGN PATENT DOCUMENTS

JP    2018-126331    8/2018
JP    6777206        10/2020

OTHER PUBLICATIONS

Jan. 25, 2022 International Search Report issued in International Pat. Appl. No. PCT/JP2021/040776, along with an English translation thereof.

*Primary Examiner* — Ali Bayat
(74) *Attorney, Agent, or Firm* — GREENBLUM & BERNSTEIN, P.L.C.

(57) ABSTRACT

An excrement determination device performs: acquiring image data captured by a camera which is located at a toilet provided in a toilet room to photograph a bowl of the toilet; acquiring sensing data from a sensor that detects sitting and leaving of a user onto and from the toilet; deciding whether to validate or invalidate the image data on the basis of a change in the sensing data; determining, on the basis of image data decided to be valid, an occurrence of at least one of defecation and urination; and outputting a result of the determination.

17 Claims, 13 Drawing Sheets

Related U.S. Application Data

(60) Provisional application No. 63/121,511, filed on Dec. 4, 2020.

(58) Field of Classification Search
USPC .......................................................... 382/103
See application file for complete search history.

(56) References Cited

U.S. PATENT DOCUMENTS

| | | | |
|---|---|---|---|
| 2018/0153669 A1* | 6/2018 | Herrera | A61F 2/0022 |
| 2018/0153670 A1* | 6/2018 | Herrera | A61F 2/0022 |
| 2018/0188231 A1* | 7/2018 | Barakat | C12Q 1/001 |
| 2018/0303466 A1* | 10/2018 | Kashyap | A61B 10/0038 |
| 2019/0010689 A1* | 1/2019 | Hall | A61B 10/0038 |
| 2019/0369085 A1* | 12/2019 | Tan | G01N 33/493 |

* cited by examiner

EXCREMENT DETERMINATION METHOD, EXCREMENT DETERMINATION DEVICE, AND NON-TRANSITORY COMPUTER READABLE RECORDING MEDIUM

TECHNICAL FIELD

The present disclosure relates to a technology of determining excrement on the basis of image data.

BACKGROUND ART

Patent Literature 1 discloses a technology of: detecting an occurrence of defecation or urination on the basis of a change in a water level of water pooled at a bottom of a bowl part; and causing photographing means to photograph feces or urine until detection of a finish of the defecation or urination.

However, the technology of Patent Literature 1 has a possibility of misrecognition of excrement in an attempt to recognize an image of excrement from image data captured by the photographing means in an occurrence of a change in a sitting state of a user sitting on the toilet, and thus needs further improvement.

CITATION LIST

Patent Literature

Patent Literature 1: Japanese Unexamined Patent Publication No. 2018-126331

SUMMARY OF INVENTION

This disclosure has been achieved to solve the drawbacks described above, and has an object of providing a technology of preventing misrecognition of an image of excrement from image data in an occurrence of a change in a sitting state of a user sitting on a toilet.

An excrement determination according to one aspect of this disclosure is an excrement determination method for an excrement determination device that determines excrement. The excrement determination method includes, by a processor included in the excrement determination device: acquiring image data captured by a camera which is located at a toilet provided in a toilet room to photograph a bowl of the toilet; acquiring sensing data from a sensor that detects sitting and leaving of a user onto and from the toilet; deciding whether to validate or invalidate the image data on the basis of a change in the sensing data; determining, on the basis of image data decided to be valid, an occurrence of at least one of defecation and urination by the user; and outputting a result of the determination.

This disclosure achieves prevention of misrecognition of an image of excrement from image data in an occurrence of a change in a sitting state of a user sitting on a toilet.

DETAILED DESCRIPTION

Figure 1:
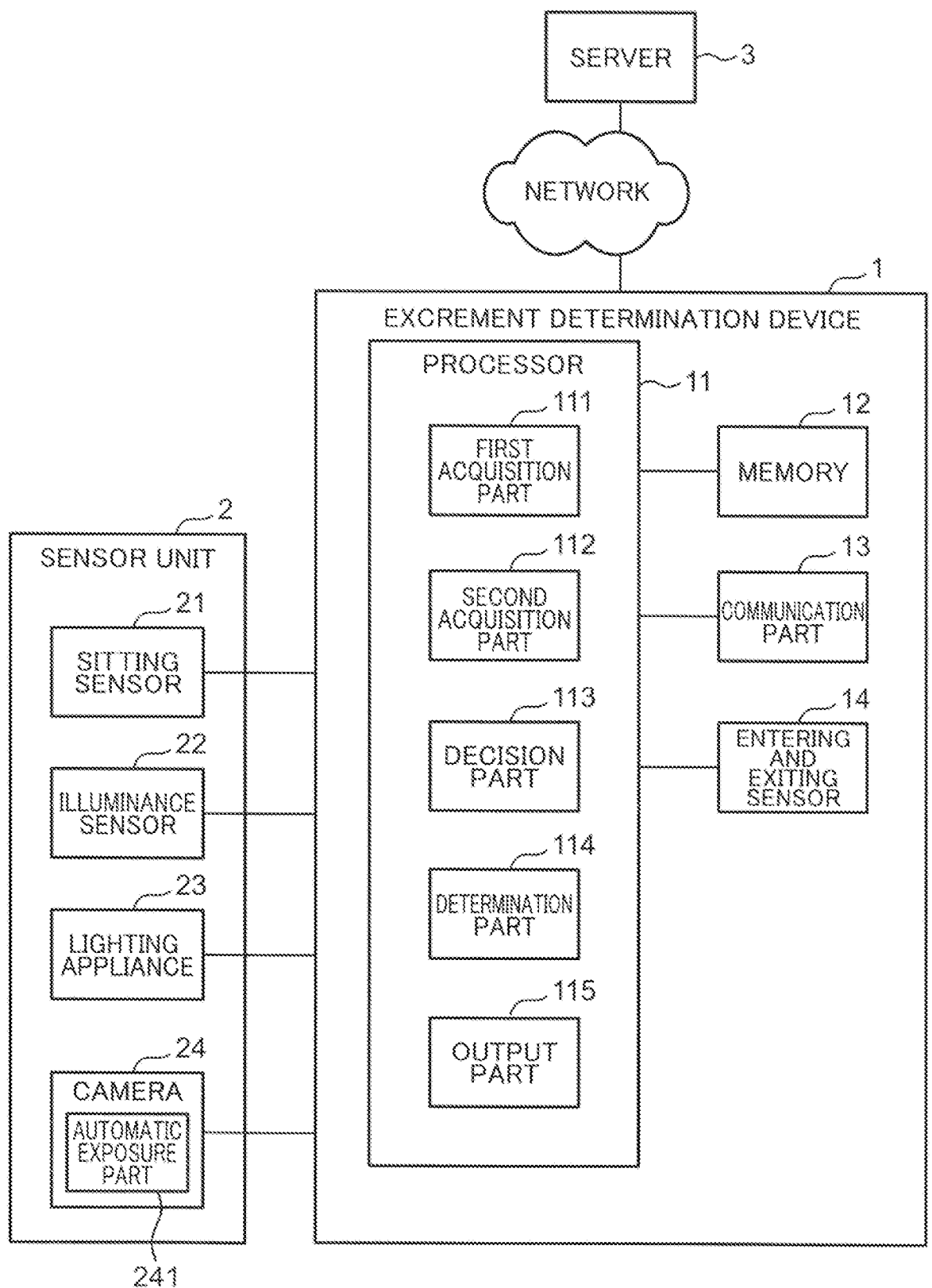
FIG. 1 is a diagram showing a configuration of an excrement determination system in a first embodiment.

Knowledge Forming the Basis of the Present Disclosure

In a care facility, excretion information including a frequency and a time of excretion about a care receiver is important to grasp a possible health risk of the care receiver. However, recordation of the excretion information by a caregiver or carer results in increasing the burden on the caregiver. Execution of the recordation of the excretion information by the caregiver near the care receiver increases a psychological burden on the care receiver. Thus, there has been a demand for recognition of excrement from image data captured by a camera which is located at a toilet, generation of excretion information based on a result of the recognition, and automatic recordation of the generated excretion information.

In this regard, a change in a sitting state may occur at defecation, such as raising of buttocks of a user from a toilet seat due to re-sitting, or opening of legs to wipe off excrement during sitting. Such a change in the sitting state brings a drastic increase in external light entering a bowl of the toilet. This leads to a drastic increase in the luminance of image data captured by the camera, and a difficulty in accurately recognizing excrement from image data. At this time, an automatic exposure function of the camera comes into operation, but a specific time is required until an exposure of the camera reaches an appropriate value corresponding to the external light. It is difficult to accurately recognize excrement from the image data captured in the specific time.

In particular, a care receiver who needs assistance of a caregiver to sit on a toilet tend to repeat re-sitting many times until completion of the sitting action, and thus the sitting state frequently changes. Moreover, it is uneasy for the care receiver to wipe the buttocks thereof with tissue paper, and thus, the sitting state frequently changes at this time as well. This makes it difficult to accurately recognize excrement of the care receiver from image data.

The present disclosure has been achieved to solve the drawbacks described above.

An excrement determination according to one aspect of this disclosure is an excrement determination method for an excrement determination device that determines excrement. The excrement determination method includes, by a processor included in the excrement determination device: acquiring image data captured by a camera which is located at a toilet provided in a toilet room to photograph a bowl of the toilet; acquiring sensing data from a sensor that detects sitting and leaving of a user onto and from the toilet; deciding whether to validate or invalidate the image data on the basis of a change in the sensing data; determining, on the basis of image data decided to be valid, an occurrence of at least one of defecation and urination by the user, and outputting a result of the determination.

According to this configuration, the image data is decided to be validated or invalidated on the basis of a change in the sensing data from the sensor that detects sitting and leaving of the user onto and from the toilet. Even image data captured in a drastic change in external light entering the bowl in accordance with a change in the sitting state thus can be decided to be invalidated. The invalidation decision keeps excrement detection from being applied to the image data captured in the drastic change in the external light entering the bowl. This results in preventing misrecognition of excrement in an occurrence of a change in the sitting state of the user sitting on the toilet.

In the excrement determination method, in the deciding, the image data may be invalidated when the change in the sensing data is beyond a predetermine range after the sensing data indicates the sitting.

This configuration accomplishes invalidation of the image data in an occurrence of re-sitting by the user sitting on the toilet performs.

In the excrement determination method, in the deciding, the leaving of the user from the toilet may be judged when the sensing data continuously indicates the leaving for a first period.

According to this configuration, the leaving is judged when the sensing data continuously indicates the leaving for the first period, and thus, the leaving of the user from the toilet can be accurately judged.

In the excrement determination method, in the deciding, when the change in the sensing data continuously falls within the predetermined range for a second period after the sending data indicates the sitting, at least image data captured in the second period may be invalidated.

According to this configuration, after the sensing data indicates the sitting, the image data captured before a lapse of the second predetermined period in which the change in the sensing data falls within the predetermined range is invalidated. This permits the excrement detection to be applied to the image data only when the exposure of the camera reaches an appropriate value corresponding to the external light by the auto exposure function even in the drastic reduction in the external light entering the bowl part due to the re-sitting of the user onto the toilet, resulting in achieving prevention of misrecognition of excrement.

In the excrement determination method, in the deciding, the sitting may be judged when the change in the sensing data continuously falls within the predetermined range for the second period after the sending data indicates the sitting.

This configuration enables judgment of the sitting only when the exposure of the camera reaches an appropriate value corresponding to the external light.

In the excrement determination method, in the deciding, the image data may be invalidated when the change in the sensing data is beyond the predetermined range after the judgment of the sitting.

This configuration accomplishes invalidation of the image data in an occurrence of the change in the sitting state after the judgment of the sitting.

In the excrement determination method, the sensing data may include a distance value from a distance measurement sensor or an illuminance value from an illuminance sensor.

This configuration adopts the distance value from the distance measurement sensor or the illuminance value from the illuminance sensor as sensing data, and thus attains accurate detection of the sitting and leaving of the user.

In the excrement determination method, in the determining, an occurrence of at least one of the defecation and the urination may be determined by using valid image in a predetermined period before a newest image.

According to this configuration, an occurrence of at least one of the defecation and the urination is determined by using valid image data in the predetermined period before the newest image data, and thus this configuration achieves reliable prevention of application of the excrement detection to the image data decided to be invalid.

In the excrement determination method, in the determining, an occurrence of at least one of the defecation and the urination may be determined by comparing the image data captured by the camera with reference toilet color data, and the reference toilet color data may be calculated on the basis of color data of a region in the bowl, the region being at a predetermined distance away from a fringe of the toilet toward a pool part of the toilet.

According to this configuration, the reference toilet color data is generated on the basis of image data of a region in the bowl, the region being at the predetermined distance away from the fringe of the toilet toward the pool part of the toilet. This achieves generation of the reference toilet color data on the basis of color data of a region of the bowl except for the fringe where an adhered stain is hard to remove, and attains accurate detection of excrement from the image data.

An excrement determination program according to another aspect of the disclosure causes a computer to execute the excrement determination method.

With this configuration, it is possible to provide an excrement determination program that exerts operational effects equivalent to those of the excrement determination method described above.

An excrement determination device according to another aspect of the disclosure is an excrement determination device that determines excrement. The excrement determination device includes: a first acquisition part that acquires image data captured by a camera which is located at a toilet provided in a toilet room to photograph a bowl of the toilet; a second acquisition part that acquires sensing data from a sensor that detects sitting and leaving of a user onto and from the toilet; a decision part that decides whether to validate or invalidate the image data on the basis of a change in the sensing data; a determination part that determines, on the basis of image data decided to be valid, an occurrence of at least one of defecation and urination by the user; and an output part that outputs a result of the determination.

With this configuration, it is possible to provide an excrement determination device that exerts operational effects equivalent to those of the excrement determination method described above.

An excrement determination method according to another aspect of this disclosure is an excrement determination method for an excrement determination device that determines excrement. The excrement determination method includes, by a processor included in the excrement determination device: acquiring image data captured by a camera which is located at a toilet provided in a toilet room to photograph a bowl of the toilet; deciding whether to validate or invalidate the image data on the basis of a change in the image data; determining, on the basis of image data decided to be valid, an occurrence of at least one of defecation and urination; and outputting a result of the determination.

When the sitting state changes in re-sitting onto the toilet or opening legs to wipe off excrement, external light entering the bowl drastically changes. A change in an amount of the light results in a change in the image data. According to this configuration, it is decided whether to validate or invalidate the image data on the basis of a change in the image data. Even image data captured in a period in which the external light entering the bowl drastically changes in accordance with a change in the sitting state thus can be decided to be invalidated. The invalidation decision keeps excrement detection from being applied to the image data captured in the drastic change in the external light entering the bowl. This results in preventing misrecognition of excrement in an occurrence of a change in the sitting state of the user sitting on the toilet.

In the excrement determination method, in the deciding, a predetermined object may be detected from the image data, and the image data may be invalidated when the detected object satisfies a predetermined condition that the pixel number of the object drastically changes.

When external light entering the bowl drastically changes in accordance with a change in the sitting state, the change results in a change in the pixel number of the predetermined object included in the image data. According to this configuration, the image data is determined as invalid when the predetermined object included in the image data satisfies the predetermined condition that the pixel number of the object drastically changes. This configuration thus attains accurate detection of the change in the sitting state from the image data.

In the excrement determination method, the predetermined condition may include a condition that the pixel number of the object increases at a predetermined increase rate or higher, and decreases at a predetermined decrease rate or higher.

This configuration achieves distinction between: a drastic change in the pixel number attributed to diarrhea, urination, and breeding; and a change in the pixel number of the predetermined object in accordance with the change in the sitting state.

In the excrement determination method, the predetermined condition may include a condition that: a pixel number at a t-th sampling point is larger than a value which is P1-times larger than a pixel number at a (t−1)-th sampling point; and a pixel number at a k-th sampling point being at least one sampling point in a predetermined past period from the t-th sampling point is smaller than a value which is P2-times larger than a pixel number at a (k−1)-th sampling point, wherein t is a positive integer, k is equal to or smaller than t−1, and P2 is smaller than P1.

This configuration attains accurate detection of a drastic change in the pixel number of the predetermined object in accordance with the change in the sitting state.

In the excrement determination method, the predetermined object may include at least one of urine, feces, and blood.

When the external light entering the bowl drastically changes in accordance with the change in the sitting state, the change results in a change in a size of an image indicating each of, urine, feces, and blood detected from the image data. This configuration therefore attains accurate detection of a change in the sitting state from the change in the pixel number of each of the urine, the feces, and blood.

In the excrement determination method, in the determining, an occurrence of at least one of the defecation and the urination may be determined by using valid image data in a predetermined period before a newest image.

According to this configuration, an occurrence of at least one of the defecation and the urination is determined by using valid image data in the predetermined period before the newest image data. This configuration thus achieves reliable prevention of application of the excrement detection to the image data decided to be invalid.

In the excrement determination method, in the determining, an occurrence of at least one of the defecation and the urination may be determined by comparing the image data captured by the camera with reference toilet color data, and the reference toilet color data may be calculated on the basis of color data of a region in the bowl, the region being at a predetermined distance away from a fringe of the bowl toward a pool part.

According to this configuration, the reference toilet color data is generated on the basis of image data of a region in the bowl, the region being at the predetermined distance away from the fringe of the toilet toward the pool part of the toilet. This achieves generation of the reference toilet color data on the basis of color data of a region of the bowl except for the fringe where an adhered stain is hard to remove, and attains accurate detection of excrement from the image data.

An excrement determination program according to still another aspect of the disclosure causes a computer to execute the excrement determination method.

With this configuration, it is possible to provide an excrement determination program that exerts operational effects equivalent to those of the excrement determination method described above.

An excrement determination device according to another aspect of the disclosure is an excrement determination device that determines excrement. The excrement determination device includes: an acquisition part that acquires image data captured by a camera which is located at a toilet provided in a toilet room to photograph a bowl of the toilet; a decision part that decides whether to validate or invalidate the image data on the basis of a change in the image data: a determination part that determines, on the basis image data decided to be valid, an occurrence of at least one of defecation and urination; and an output part that outputs a result of the determination.

With this configuration, it is possible to provide an excrement determination device that exerts operational effects equivalent to those of the excrement determination method described above.

This disclosure can be realized as an excrement determination system caused to operate by the excrement determination program. Additionally, it goes without saying that the computer program is distributable as a non-transitory computer readable storage medium like a CD-ROM, or distributable via a communication network like the Internet.

Each of the embodiments which will be described below represents a specific example of the disclosure. Numeric values, shapes, constituent elements, steps, and the order of the steps described below are mere examples, and thus should not be construed to delimit the disclosure. Moreover, constituent elements which are not recited in the independent claims each showing the broadest concept among the constituent elements in the embodiments are described as selectable constituent elements. The respective contents are combinable with each other in all the embodiments.

First Embodiment

FIG. 1 is a diagram showing a configuration of an excrement determination system in a first embodiment. FIG.

2 is a view explaining arrangement positions of a sensor unit 2 and an excrement determination device 1 in the first embodiment of the disclosure.

Figure 2:
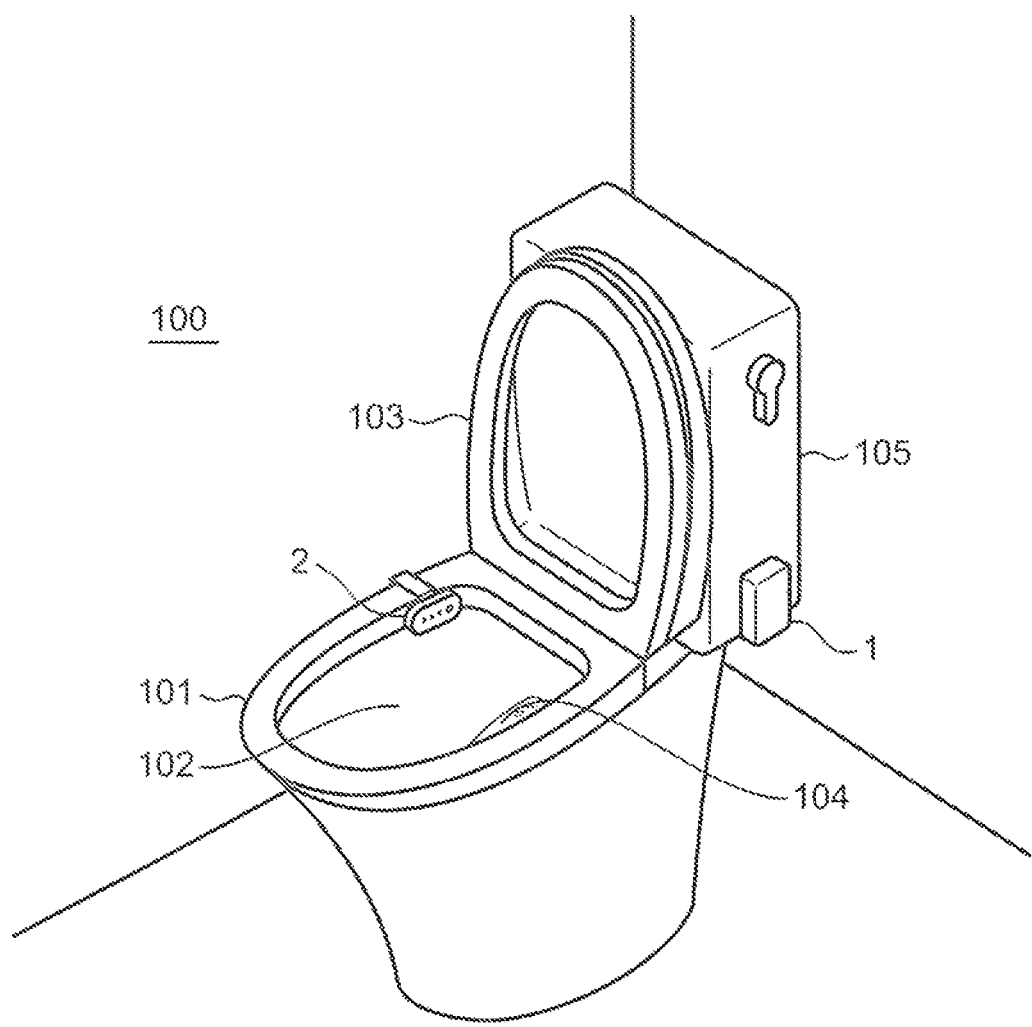
FIG. 2 is a view explaining arrangement positions of a sensor unit and an excrement determination device in the first embodiment.

The excrement determination system shown in FIG. 1 includes the excrement determination device 1, the sensor unit 2, and a server 3. The excrement determination device 1 determines, on the basis of image data captured by a camera 24, whether excretion by a user occurs. The excrement determination device 1 is arranged, for example, on a side surface of a water reservoir tank 105 as shown in FIG. 2. However, this is a mere example, and the excrement determination device 1 may be arranged on a wall of a toilet room, or imbedded in the sensor unit 2. Thus, an arrangement position of the device is not particularly limited. The excrement determination device 1 is connected to the server 3 via a network. The network includes, for example, a wide area network like the internet. The server 3 manages excretion information about the user generated by the excrement determination device 1.

The sensor unit 2 is attached, for example, onto a fringe part 101 of a toilet 100 as shown in FIG. 2. The sensor unit 2 is communicably connected to the excrement determination device 1 via a predetermined communication channel. The communication channel may include a wireless channel, such as the Bluetooth (registered mark) or a wireless LAN, or a wired LAN.

As shown in FIG. 2, the toilet 100 includes the fringe part 101 and a bowl 102. The fringe part 101 is located at an upper end of the toilet 100 and defines an opening section of the toilet 100. The bowl 102 is located below the fringe part 101 to receive feces and urine.

The bowl 102 has a bottom provided with a pool part 104 for pooling water. The pool part 104 is provided with an unillustrated drain hole. The feces and the urine excreted in the bowl 102 is caused to flow to a sewage pipe through the drain hole. In other words, the toilet 100 is in the form of a toilet of a flush type. A toilet seat 103 is provided on the top of the toilet 100 to allow the user to sit thereon. The toilet seat 103 is rotatable upward and downward. The user sits on the toilet seat 103 lowered to lie on the fringe part 101. The water reservoir tank 105 that stores flush water to cause the feces and the urine to flow is provided in the rear of the toilet 100.

Referring back to FIG. 1, the sensor unit 2 includes a sitting sensor 21, an illuminance sensor 22, a lighting device 23, and the camera 24. Each of the sitting sensor 21 and the illuminance sensor 22 serves as an example of a sensor that detects sitting and leaving of the user onto and from the toilet 100.

The sitting sensor 21 is arranged at the toilet 100 to measure a distance to the buttocks of the user sitting on the toilet 100. The sitting sensor 21 includes, for example, a distance measurement sensor to measure a distance value indicating the distance to the buttocks of the user sitting on the toilet 100. Examples of the distance measurement sensor include an infrared distance measurement sensor. The sitting sensor 21 measures the distance value at a predetermined sampling rate, and inputs the measured distance value to the excrement determination device 1 at a predetermined sampling rate. The sitting sensor 21 serves as an example of the sensor that detects a sitting state of the user. The distance value serves as an example of sensing data indicating each of sitting and leaving of the user.

The illuminance sensor 22 is arranged at the toilet 100 to measure illuminance in the bowl 102. The illuminance sensor 22 measures illuminance or an illuminance value in the bowl 102 at a predetermined sampling rate, and inputs the measured illuminance value to the excrement determination device 1 at a predetermined sampling rate. The illuminance value serves as an example of the sensing data indicating each of the sitting and the leaving of the user.

The lighting device 23 is arranged at the toilet 100 to light up the inside of the bowl 102. The lighting device 23 is, for example, a white LED to light up the inside of the bowl 102 under a control of the excrement determination device 1.

The camera 24 is located at the toilet 100 to photograph the bowl 102. For instance, the camera 24 has a high sensitivity and a wide angle, and is configured to capture a color image having an R (red) component, a G (green) component, and a B (blue) component. The camera 24 photographs the inside of the bowl 102 at a predetermined frame rate, and transmits obtained image data to the excrement determination device 1 at a predetermined sampling rate.

The camera 24 includes an automatic exposure part 241. The automatic exposure part 241 executes an automatic exposure function of controlling an exposure of the camera 24 to reach an appropriate value corresponding to the illuminance in the bowl 102. Here, the automatic exposure part 241 may control the exposure of the camera 24 on the basis of the illuminance value detected by the illuminance sensor 22.

The excrement determination device 1 includes a processor 11, a memory 12, a communication part 13, and an entering and exiting sensor 14.

For instance, the processor 11 includes a center processing unit (CPU) or an ASIC (application specific integrated circuit). The processor 11 has a first acquisition part 111, a second acquisition part 112, a decision part 113, a determination part 114, and an output part 115.

The first acquisition part 111 acquires the image data captured by the camera 24 at a predetermined sampling rate.

The second acquisition part 112 acquires the distance value measured by the sitting sensor 21 at a predetermined sampling rate. The second acquisition part 112 acquires the illuminance value measured by the illuminance sensor 22 at a predetermined sampling rate.

The decision part 113 decides whether to validate or invalidate the image data acquired by the first acquisition part 111 on the basis of a change in sensing data from the sitting sensor 21 or the illuminance sensor 22. In detail, the decision part 113 invalidates the image data when the change in the sensing data is beyond a predetermined range after the sensing data from the sitting sensor 21 or the illuminance sensor 22 indicates the sitting. Here, the image data to be invalidated may be image data in a specific period from a current point to a past point, or may be image data in a specific period before and after the current point serving as a reference.

The decision part 113 judges the leaving of the user from the toilet 100 when the sensing data from the sitting sensor 21 or the illuminance sensor 22 continuously indicates the leaving for a first period. The first period is, for example, a predetermined period from the leaving indicated by the sensing data to prospective standing-up of the user from the toilet 100. The first period can take an appropriate value, e.g., five seconds, ten seconds, or twelve seconds.

When the change in the sensing data continuously falls within the predetermined range for a second period after the sensing data from the sitting sensor 21 or the illuminance sensor 22 indicates the sitting, the decision part 113 invalidates at least image data captured in the second period. The second period is, for example, a period predetermined on the presumption that external light entering the inside of the bowl 102 reduces due to the sitting, and the automatic exposure part 241 of the camera 24 comes into operation to allow an exposure of the camera 24 to reach an appropriate value corresponding to the reduced external light.

The decision part 113 further judges the sitting when the change in the sensing data continuously falls within the predetermined range for a second period after the sensing data from the sitting sensor 21 or the illuminance sensor 22 indicates the sitting.

The decision part 113 invalidates the image data when the change in the sensing data from the sitting sensor 21 or the illuminance sensor 22 is beyond the predetermined range after the judgment of the sitting of the user onto the toilet 100. In this manner, when re-sitting onto the toilet 100 occurs after the judgment of the sitting, the image data is invalidated and misrecognition of excrement is preventable.

The determination part 114 determines, on the basis of image data decided to be valid by the decision part 113, an occurrence of each of defecation and urination by the user. In detail, the determination part 114 sets a detection area D1 (see FIG. 13) including the pool part 104 onto the valid image data, and determines an occurrence of each of defecation and urination by comparing image data (hereinafter, referred to as "detection area data") of the detection area D1 with reference toilet color data. Specifically, the determination part 114 removes pixel data having a color (reference toilet color) indicated by the reference toilet color data from the detection area data. Here, the determination part 114 may remove, from the detection area data, pixel data having R, G. B values each falling within a predetermined range with respect to each of R, G, B values of the reference toilet color.

The determination part 114 may determine an occurrence of urination when detection area data (hereinafter, referred to as "determination target image data") excluding the pixel data of the reference toilet color satisfies a urination condition. The determination part 114 may determine an occurrence of defecation when the determination target image data satisfies a defecation condition.

The determination part 114 may further determine bleeding or no-bleeding of the user on the basis of the image data decided to be valid. In this case, the determination part 114 may determine an occurrence of the bleeding of the user when the determination target image data satisfies a bleeding condition.

The reference toilet color data is calculated on the basis of image data of a reference region C2 (see FIG. 13) in the bowl 102, the region being at a predetermined distance away from the fringe part 101 of the toilet 100 toward the pool part 104. Specifically, the reference toilet color data has an average value of each of R, G, B values of the reference region C2.

The output part 115 generates excretion information including a result of the determination by the determination part 114, and outputs the generated excretion information. The output part 115 may transmit the excretion information to the server 3 by using the communication part 13, or may cause the memory 12 to store the excretion information.

For instance, the memory 12 includes a storage device, such as a RAM (Random Access Memory), an SSD (Solid State Drive) or a flash memory, for storing various kinds of information. The memory 12 stores, for example, the excretion information and the reference toilet color data. The memory 12 may be a portable memory like a USB (Universal Serial Bus) memory.

The communication pail 13 includes a communication circuit serving to connect the excrement determination device 1 to the server 3 via the network. The communication part 13 serves to connect the excrement determination device 1 and the sensor unit 2 to each other via the communication channel. The excretion information associates, for example, information about an occurrence of excretion (defecation, urination, and bleeding) with daily time information indicating an excretion date and time. For instance, the excrement determination device 1 may generate excretion information per day and transmit the generated excretion information to the server 3.

The entering and exiting sensor 14 includes, for example, a distance measurement sensor. The entering and exiting sensor 14 detects entering of the user into a toilet room where the toilet 100 is provided. Here, the distance measurement sensor constituting the entering and exiting sensor 14 has a lower measurement accuracy but a wider detection range than the distance measurement sensor constituting the sitting sensor 21. The entering and exiting sensor 14 may include, for example, a human sensor in place of the distance measurement sensor. Examples of the distance measurement sensor include an infrared distance measurement sensor. The human sensor detects the user located within a predetermined distance to the toilet 100.

Figure 3:
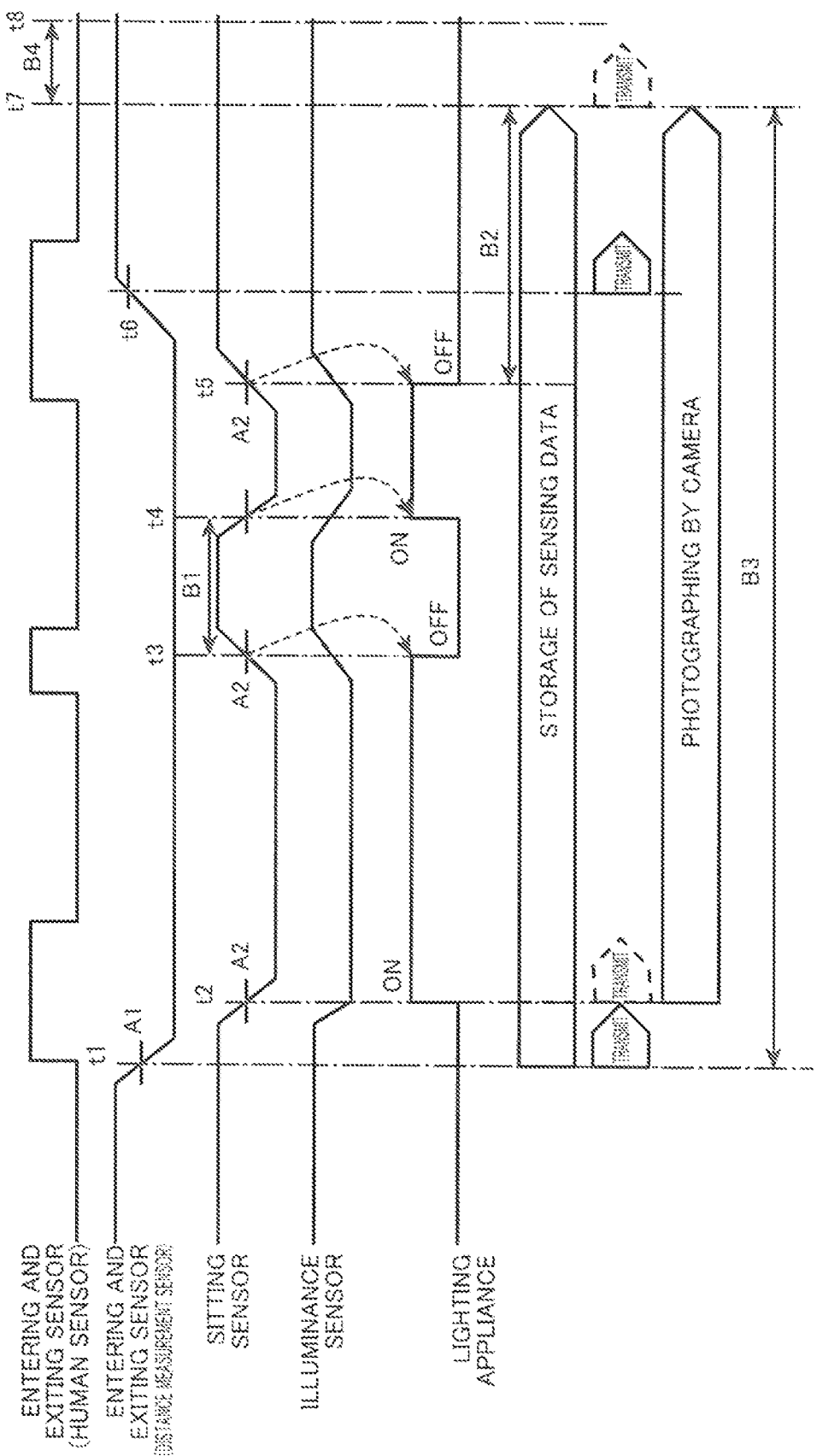
FIG. 3 is a sequence diagram showing an overview of a process by the excrement determination device in the first embodiment.

Heretofore, the configuration of the excrement determination system is described. Next, an overview of a process by the excrement determination device 1 will be described. FIG. 3 is a sequence diagram showing the overview of the process by the excrement determination device 1 in the first embodiment.

In FIG. 3, the first row shows a sequence about the entering and exiting sensor 14 in the form of the human sensor, the second row shows a sequence about the entering and exiting sensor 14 in the form of the distance measurement sensor, the third row shows a sequence about the sitting sensor 21, the fourth row shows a sequence about the illuminance sensor 22, and the filth row shows a sequence about the lighting device 23. Although the example in FIG. 3 shows the sequences about both the entering and exiting sensor 14 in the form of the human sensor and the entering and exiting sensor 14 in the form of the distance measurement sensor, the excrement determination device 1 may include the entering and exiting sensor 14 in at least one of the forms.

At a time t1, a user enters the toilet room. In accordance with the entering, the decision part 113 determines that the user has entered the toilet room on the basis of sensing data input from the entering and exiting sensor 14 in the form of the human sensor or the entering and exiting sensor 14 in the form of the distance measurement sensor. Here, the entering and exiting sensor 14 in the form of the human sensor sets the sensing data to "high" when detecting the user, and sets the sensing data to "low" when ceasing to detect the user. The decision part 113 thus determines the entering of the user into the toilet room when the sensing data input from the entering and exiting sensor 14 in the form of the human sensor becomes "high". The decision part 113 further determines the entering of the user into the toilet room when a distance value measured by the entering and exiting sensor 14 in the form of the distance measurement sensor reaches a threshold A1 or smaller. The threshold A1 can take an appropriate value. e.g., 50 cm, 100 cm, or 150 cm.

At the time t1, the decision part 113 starts to store, in the memory 12, the sensing data input from the entering and exiting sensor 14, the sitting sensor 21, and the illuminance sensor 22.

At the time t1, the decision part 113 transmits, to the server 3 by using the communication part 13, an entering notification indicating the entering of the user into the toilet room in response to the detection of the user.

At a time t2, the user sits on the toilet 100. In accordance with the sitting, a distance value input from the sitting sensor 21 reaches a sitting detection threshold A2 or smaller, and the decision part 113 determines that the user has sit on the toilet 100. The sitting detection threshold A2 has, for example, a predetermined value indicating that the distance value from the sitting sensor 21 to the buttocks of the user shows sitting of the user onto the toilet 100. The sitting detection threshold A2 is smaller than the threshold A1, and can take an appropriate value. e.g., 10 cm, 15 cm, or 20 cm.

At the time t2, an illuminance value input from the illuminance sensor 22 decreases since the buttocks of the user block the external light entering the bowl 102 due to the sitting.

At the time 2, the decision part 113 turns on the lighting device 23 in response to the detection of the sitting. The lighting device 23 lights up the inside of the bowl 102 to ensure a light amount necessary for extracting excrement from image data.

At the time t2, the decision part 113 further activates the camera 24 to cause the camera 24 to photograph the inside of the bowl 102. Thereafter, the first acquisition part 111 acquires image data at a predetermined sampling rate.

The entering notification may be transmitted at the time t2.

In a period B1 from a time 3 to a time t4, re-sitting by the user onto the toilet 100 occurs. In accordance with the re-sitting, the distance value from the sitting sensor 21 exceeds the sitting detection threshold A2 at the time 3, and the distance value from the sitting sensor 21 falls below the sitting detection threshold A2 at the time t4. The decision part 113 turns off the lighting device 23 at the time 13, and the decision part 113 turns on the lighting device 23 at the time t4. The illuminance value from the illuminance sensor 22 also changes in conjunction with the distance value from the sitting sensor 21.

At a time t5, the user leaves the toilet 100. In accordance with the leaving, the distance value from the sitting sensor 21 exceeds the sitting detection threshold A2. The decision part 113 turns off the lighting device 23 at the time t5.

The distance value from the entering and exiting sensor 14 exceeds the threshold A1 at a time t6, and hence, the decision part 113 determines that the user has exited the toilet room. In accordance with the determination, the output part 115 transmits, to the server 3 by using the communication part 13, an exiting notification indicating the exiting of the user from the toilet room. At the time t6, the output part 115 transmits, to the server 3 by using the communication part 13, excretion information generated on the basis of image data. The exiting notification and the excretion information may be transmitted at a time 7.

At the time t7, the decision part 113 finishes storing the sensing data into the memory 12 and further causes the camera 24 to finish photographing the inside of the bowl 102 since the distance value from the sitting sensor 21 continuously exceeds the sitting detection threshold A2 for a period B2 from the time t5.

At a time t8, the decision part 113 brings the excrement determination device 1 into a standby state since the entering and exiting sensor 14 in the form of the human sensor continuously indicates a "high" state for a period B4 from the time t7.

Figure 4:
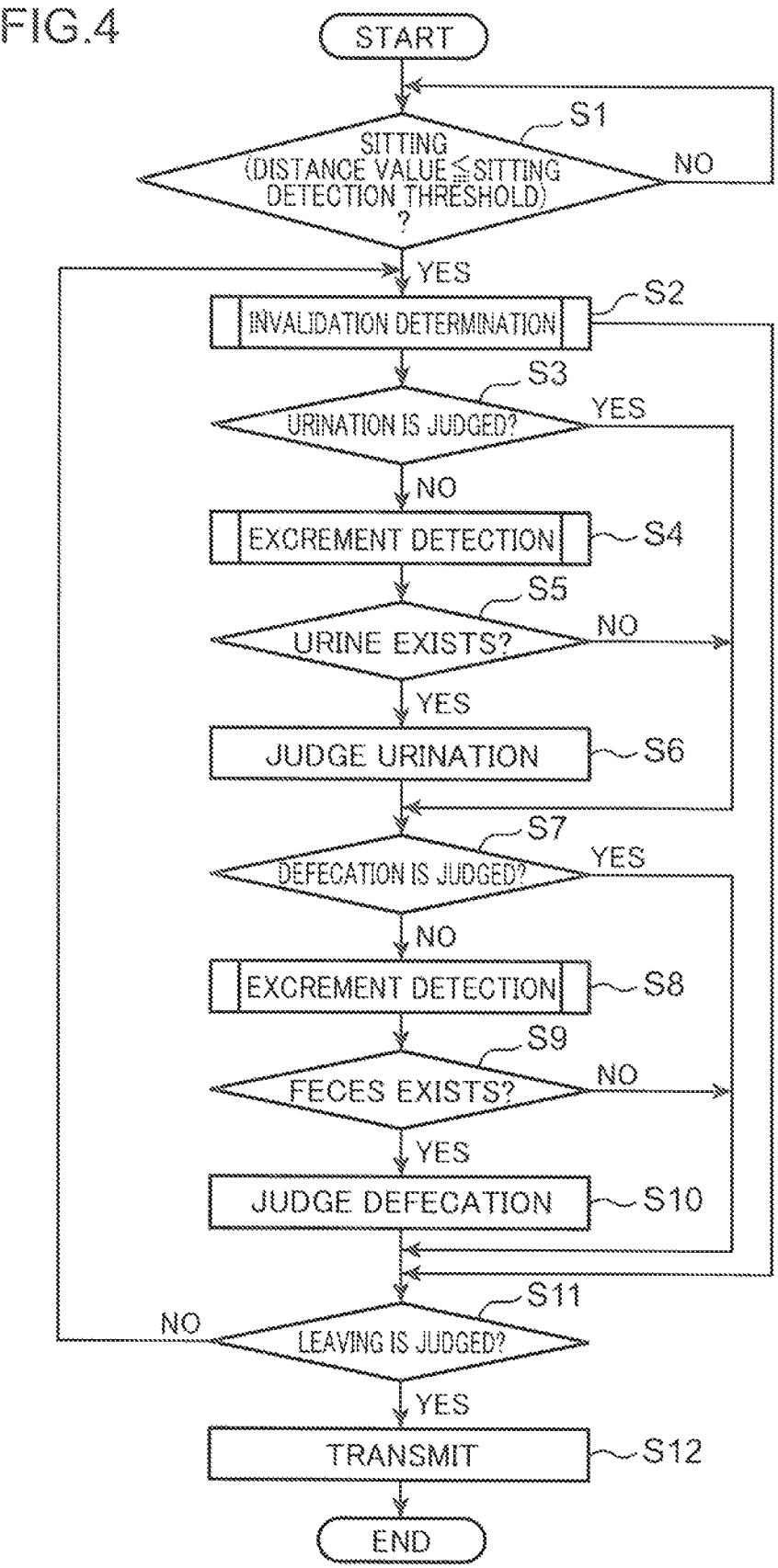
FIG. 4 a flowchart showing an example of the process by the excrement determination device in the first embodiment.

Subsequently, details of the process by the excrement determination device 1 will be described. FIG. 4 is a flowchart showing an example of the process by the excrement determination device 1 in the first embodiment of the disclosure. In the flowchart described below, the sensing data is defined as a distance value detected by the sitting sensor 21.

In step S1, the decision part 113 determines whether a user sits on the toilet 100. Here, the decision part 113 determines that the user sits when a distance value acquired from the sitting sensor 21 by the second acquisition part 112 reaches the sitting detection threshold A2 or smaller (YES in step S1), and leads the process to step S2. When the distance value is larger than the sitting detection threshold A2 (NO in step S1), the decision part 113 leads the process to step S1 for a standby.

In step S2, the decision part 113 executes invalidation determination of determining whether the image data is valid or invalid. The invalidation determination will be described in detail later with reference to FIG. 5.

In step S3, the determination part 114 determines whether urination is judged. The process proceeds to step S4 when the urination is not judged (NO in step S3), and the process proceeds to step S7 when the urination is judged (YES in step S3). The judgment of the urination stands for a certainty that image data includes an image of urine.

In step S4, the determination part 114 executes, on the basis of the image data, excrement detection to determine an occurrence of at least one of urination and defecation by the user. The excrement detection will be described in detail later with reference to FIG. 7.

When it is determined in the excrement detection that urine exists in step S5 (YES in step S5), the determination part 114 judges the urination (step S6). When no urine is detected in the excrement detection (NO in step S5), the process proceeds to step S7.

In step S7, the determination part 114 determines whether defecation is judged. The process proceeds to step S11 when the defecation is judged (YES in step S7), and the process proceeds to step S8 when the defecation is not judged (NO in step S7). The judgment of the defecation stands for certainty that image data includes an image of feces.

In step S8, the determination part 114 executes the excrement detection.

When it is determined that feces exists in the excretion detection in step S9 (YES in step S9), the determination part 114 judges defecation (step S10). When it is not determined that feces exists in the excrement detection (NO in step S9), the determination part 114 leads the process to step S11.

In step S11, the decision part 113 determines whether the leaving of the user is judged. Here, when the leaving is judged in step S42 described later, the decision part 113 determines "YES" in step S11, and leads the process to step S12. When the sitting is not judged (No in step S11), the decision part 113 causes the process to return to step S2.

In step S12, the output part 115 transmits an exiting notification and excretion information to the server 3 by using the communication part 13.

Figure 5:
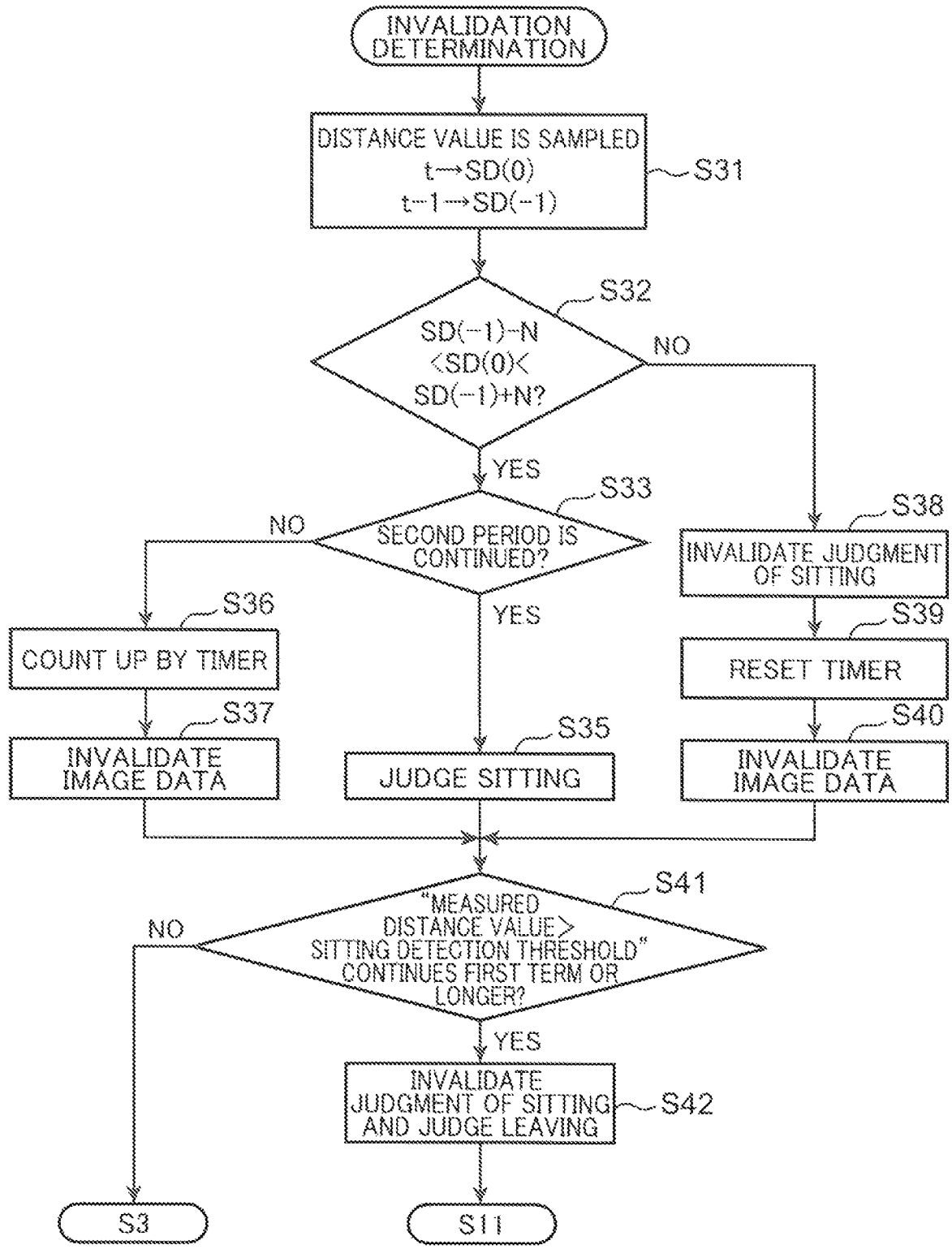
FIG. 5 is a flowchart showing details of invalidation determination.

Next, processing of the invalidation determination will be described in detail. FIG. 5 is a flowchart showing details of the invalidation determination. In step S31, the decision part 113 samples a distance value acquired by the second acquisition part 112. Here, two distance values of a distance value SD (0) at a newest sampling point (t) and a distance value SD (−1) at one previous sampling point (t−1) are sampled.

In step S32, the decision part 113 determines whether the distance value SD (0) is larger than "distance value SD (−1)−width N" and smaller than "distance value SD (−1)+width N". In other words, the decision part 113 determines whether a change in the distance value SD falls within a predetermined range. The width N can take an appropriate value, e.g., 3 mm, 4 mm, 5 mm, 6 mm, or 10 mm. A double value of the width N serves as an example of the predetermined range.

The processing proceeds to step S33 when the change in the distance value SD falls within the predetermined range (YES in step S32), the processing proceeds to step S38 when the change in the distance value SD is beyond the predetermined range (NO in step S32).

In step S33, the decision part 113 determines whether the change in the distance value SD continuously falls within the predetermined range for a second period. In the continuation of the second period (YES in step S33), the decision part 113 judges sitting of the user on the toilet 100 (step S35) and leads the proceeding to step S41. When the change in the distance value SD does not continuously falls within the predetermined range for the second period (NO in step S33), the decision part 113 causes the timer for measuring the second time period to count up (step S36).

In step S37, the decision part 113 invalidates the image data, and leads the processing to step S41. Here, the decision part 113 invalidates the image by setting "pixel count data PD(t) 0". The pixel count data PD(t) takes a count value of a pixel indicating each of feces, urine, and blood included in image data at a sampling point (t). For instance, when the image data at the sampling point (t) includes: X-pixels indicating the defecation; Y-pixels indicating the urine; and Z-pixels indicating the blood. "the pixel count data PD(t)= (X, Y, Z)" is obtained.

The decision part 113 may invalidate the image data by setting the pixel count data PD(t) in the image data from a newest sampling point to a twenty-previous sampling point, i.e., the pixel count data PD(0), PD(−1), . . . , PD(−20), to zero. The image data having the set pixel count data "PD(0), PD(−1), . . . , PD(−20)=0" is not subjected to detection about existence of excrement in excrement detection to be described later. Such setting of the pixel count data PD(0), PD(01), . . . , PD(−20) to zero accomplishes invalidation of the image data from the sampling point (0) to the sampling point (−20). The setting of the pixel count data PD to zero means setting of all the pixel count data PD about each of the feces, the urine, and the blood to zero.

Although the image data from the newest sampling point to the twenty-previous sampling point is invalidated here, this is a mere example. Only the data at the newest sampling point may be invalidated, the image data from the newest sampling point to a certain previous sampling point, in place of the twenty-previous sampling point, may be invalidated, or image data captured in a predetermined period before and after the newest sampling point including the newest sampling point may be invalidated. The invalidation way is applicable to step S40 to be described later.

In step S38, the decision part 113 invalidates sitting judgment since the change in the distance value SD is beyond the predetermined range.

In step S39, the decision part 113 resets the timer counting the second period.

In step S40, the decision part 113 invalidates the image data from the sampling point (0) to the sampling point (−20) by setting "the pixel count data PD(0) . . . PD(−20)=0", In step S41, the decision part 113 determines whether the distance value SD(0) is continuously larger than the sitting detection threshold A2 for a first period. In the continuation of the first period (YES in step S41), the decision part 113 invalidates the judgment of the sitting and judges leaving, and then leads the processing to step S11 (FIG. 4). When the distance value SD(0) is not continuously larger than the sitting detection threshold A2 for the first period (NO in step S41), the processing proceeds to step S3 (FIG. 4).

Figure 6:
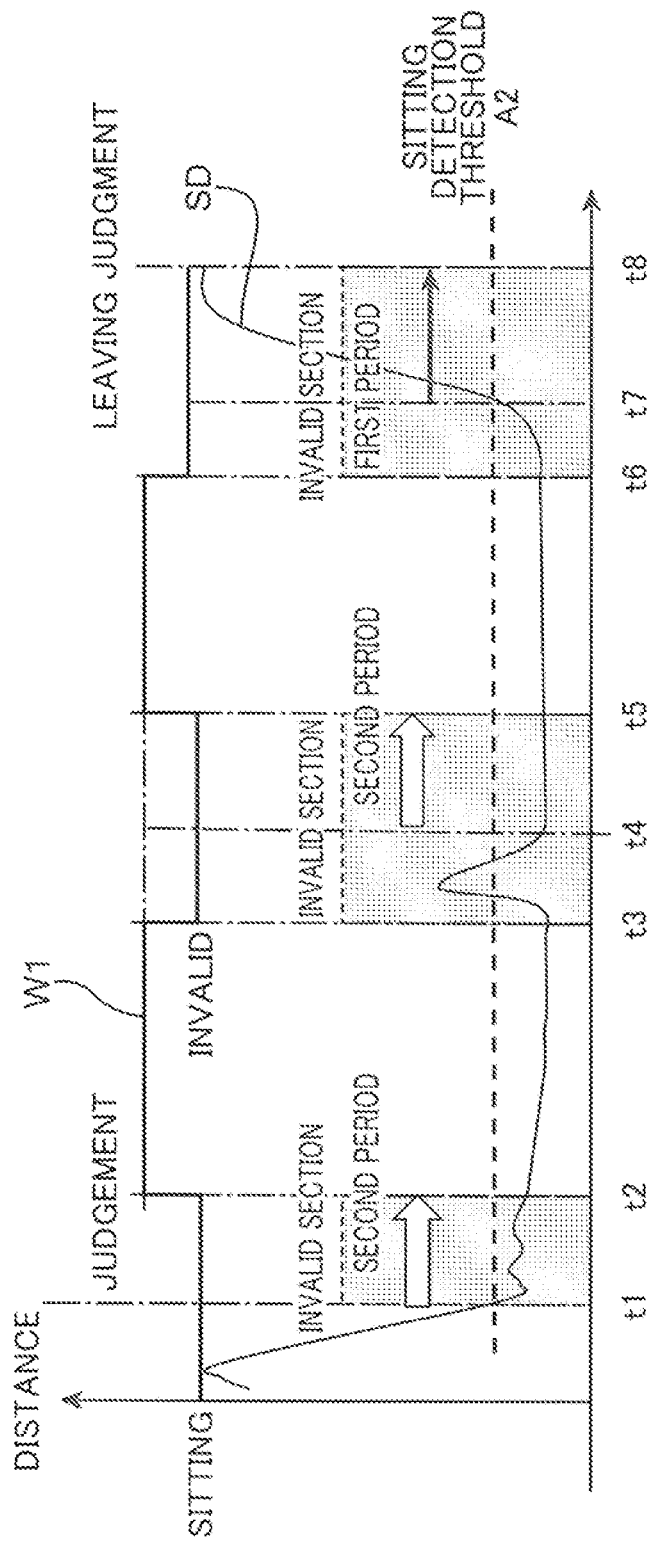
FIG. 6 is a sequence diagram explaining the invalidation determination.

FIG. 6 is a sequence diagram explaining the invalidation determination. In FIG. 6, a waveform W1 in the first row shows judgement or non-judgment of sitting. On the waveform W1, a "high" value denotes the sitting, and a "low" value denotes invalidation of the sitting.

At a time t1, the user sits on the toilet 100. The distance value SD thus reaches the sitting detection threshold A2 or smaller. At the time t1, a change in the distance value SD enters the predetermined range, and hence, a second period is started to be measured.

At the time t2, the sitting is judged since the change in the distance value SD continuously falls within the second period. As a result, the second period from the time t1 to time t2 is defined as an invalidation section. In the invalidation section, image data captured in the section is invalidated. The image data from the newest sampling point to the past-twenty sampling point may be invalidated at each of the sampling points in the invalidation section.

In a period from a time t3 to a time t4, re-sitting of the user onto the toilet 100 occurs. Due to the re-sitting, at the time t3, the change in the distance value SD is beyond the predetermined range, the judgement of the sitting is invalidated, and another invalidation section is started. Although external light entering the bowl 102 drastically increases due to the re-sitting, the image data is invalidated. Therefore, the excrement detection is not applied to the image data.

Although the distance value SD exceeds the sitting detection threshold A2 in the period from the time t3 to time 4, the distance value SD falls below the sitting detection threshold A2 immediately after the sitting of the user. Specifically, the distance value SD does not continuously exceed the sitting detection threshold A2 for the first period. Hence, the invalidation section continues.

At the time t4, another second period is started to be measured since the change in the distance value SD enters the predetermined range.

At a time t5, the invalidation section is finished and the sitting is judged since the change in the distance value SD continuously falls within the predetermined range for the second period. In this manner, the image data can be validated only when an exposure of the camera 24 reaches an appropriate value. This prevents misrecognition of excrement from the image data.

At a time t6, the user starts to leave the toilet 100. Due to the leaving, the change in the distance value SD is beyond the predetermined range, and thus, an invalidation section is started to invalidate the sitting.

At a time t7, a first period is started to be measured since the distance value SD exceeds the sitting detection threshold A2.

At a time t8, the leaving is judged since the distance value SD continuously exceeds the sitting detection threshold A2 for the first period.

Figure 7:
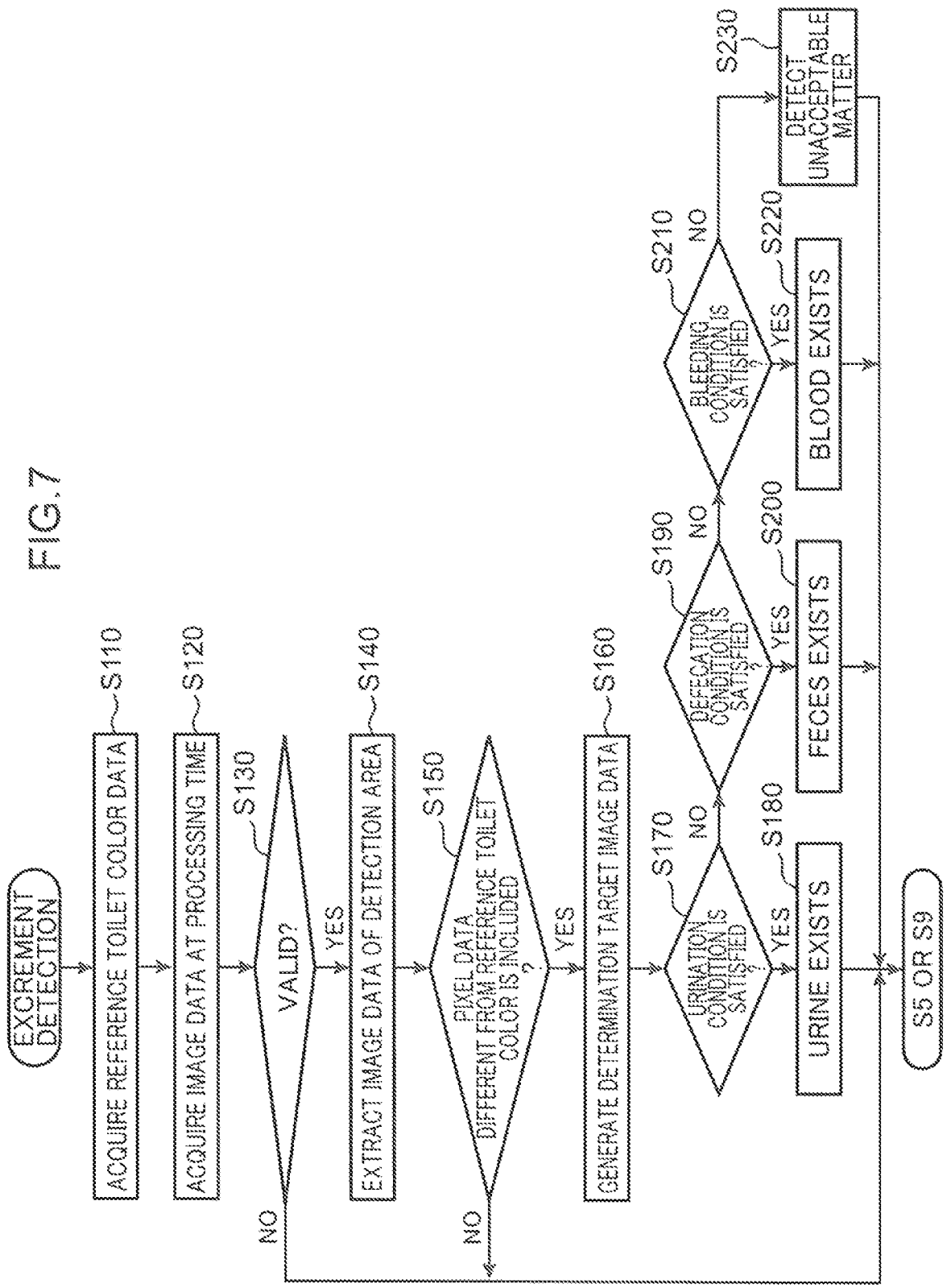
FIG. 7 is a flowchart showing an example of excrement detection.

Subsequently, processing of the excrement detection will be described. FIG. 7 is a flowchart showing an example of the excrement detection.

In step S110, the determination part 114 acquires reference toilet color data from the memory 12.

In step S120, the determination part 114 acquires image data at a processing time from the image data acquired by the first acquisition part 111. The image data at the processing time includes, for example, image data from a newest sampling point to a predetermined previous sampling point (e.g., twenty-previous sampling point). However, this is a mere example, and the image data at the processing time may be the image data at the newest sampling point.

In step S130, the determination part 114 determines whether the image data at the processing time is valid or invalid. Here, the determination part 114 determines the image data at the processing time as invalid when pixel count data PD indicates zero in the image data at the processing time, and determines the image data at the processing time as valid when the pixel count data does not indicate zero. In detail, the image data at the processing time is determined as invalid when all the pixel count data PD about each of feces, urine, and blood indicates zero. The processing proceeds to step S140 when the image data at the processing time is invalid (YES in step S130), and the processing proceeds to step S5 or step S9 (FIG. 4) when the image data at the processing time is invalid (NO in step S130).

In step S140, the determination part 114 extracts image data (detection area data) of the detection area D1 from the image data at the processing time.

In step S150, the determination part 114 determines whether the detection area data includes pixel data indicating a color different from the reference toilet color. The processing proceeds to step S160 when the detection area data includes pixel data indicating a color different from the reference toilet color (YES in step S150), and the processing proceeds to step S5 or S9 when the detection area data does not include the image data indicating a color different from the reference toilet color (NO in step S150).

In step S160, the determination part 114 generates determination target image data by removing, from the detection area data, the pixel data having R, G, B values each being beyond a predetermined range with respect to R, G, B values of the reference toilet color data.

In step S170, the determination part 114 determines whether the determination target image data satisfies a urination condition. Here, the urination condition is a condition that the determination target image data includes pixel data falling within a predetermined RGB-range indicating urine. The processing proceeds to step S180 when the urination condition is satisfied (YES in step S170), and the processing proceeds to step S190 when the urination condition is dissatisfied (NO in step S170). Here, the urination condition may include a condition that the pixel data falling within the predetermined RGB-range indicating the urine has a predetermined pixel number or larger.

In step S180, the determination part 114 determines that the target image data shows existence of urine, and leads the processing to step S5 or S9 (FIG. 4).

In step S190, the determination part 114 determines whether the determination target image data satisfies a defecation condition. Here, the defecation condition is a condition that the determination target image data includes pixel data falling within a predetermined RGB-range indicating feces. The processing proceeds to step S200 when the defecation condition is satisfied (YES in step S190), and the processing proceeds to step S210 when the defecation condition is dissatisfied (NO in step S190). Here, the defecation condition may include a condition that the pixel data falling within the predetermined RGB-range indicating the feces has a predetermined pixel number or larger.

In step S200, the determination part 114 determines that the target image data shows existence of feces, and leads the processing to step S5 or S9 (FIG. 4).

In step S210, the determination part 114 determines whether determination target image data satisfies a bleeding condition. Here, the bleeding condition is a condition that the determination target image data includes pixel data falling within a predetermined RGB-range indicating blood. The processing proceeds to step S220 when the bleeding condition is satisfied (YES in step S210), and the processing proceeds to step S230 when the bleeding condition is dissatisfied (NO in step S210). Here, the bleeding condition may include a condition that the pixel data falling within the predetermined RGB-range indicating the blood has a predetermined pixel number or larger.

In step S220, the determination part 114 determines that the target image data shows existence of blood, and leads the processing to step S5 or S9 (FIG. 4).

In step S230, the determination part 114 determines that determination target image data includes an unacceptable matter. Examples of the unacceptable matter include a diaper and toilet paper.

Conclusively, the excrement determination device 1 in the first embodiment is configured to validate or invalidate image data on the basis of a change in sensing data from a sensor that detects sitting and leaving of a user onto and from a toilet. Even image data captured in a period in which external light entering the bowl 102 drastically changes in accordance with a change in the sitting state thus can be decided to be invalidated. The invalidation decision keeps the excrement detection from being applied to the image data captured in the drastic change in the external light entering the bowl 102. This results in preventing misrecognition of excrement in an occurrence of a change in the sitting state of the user sitting on the toilet 100.

Second Embodiment

Figure 8:
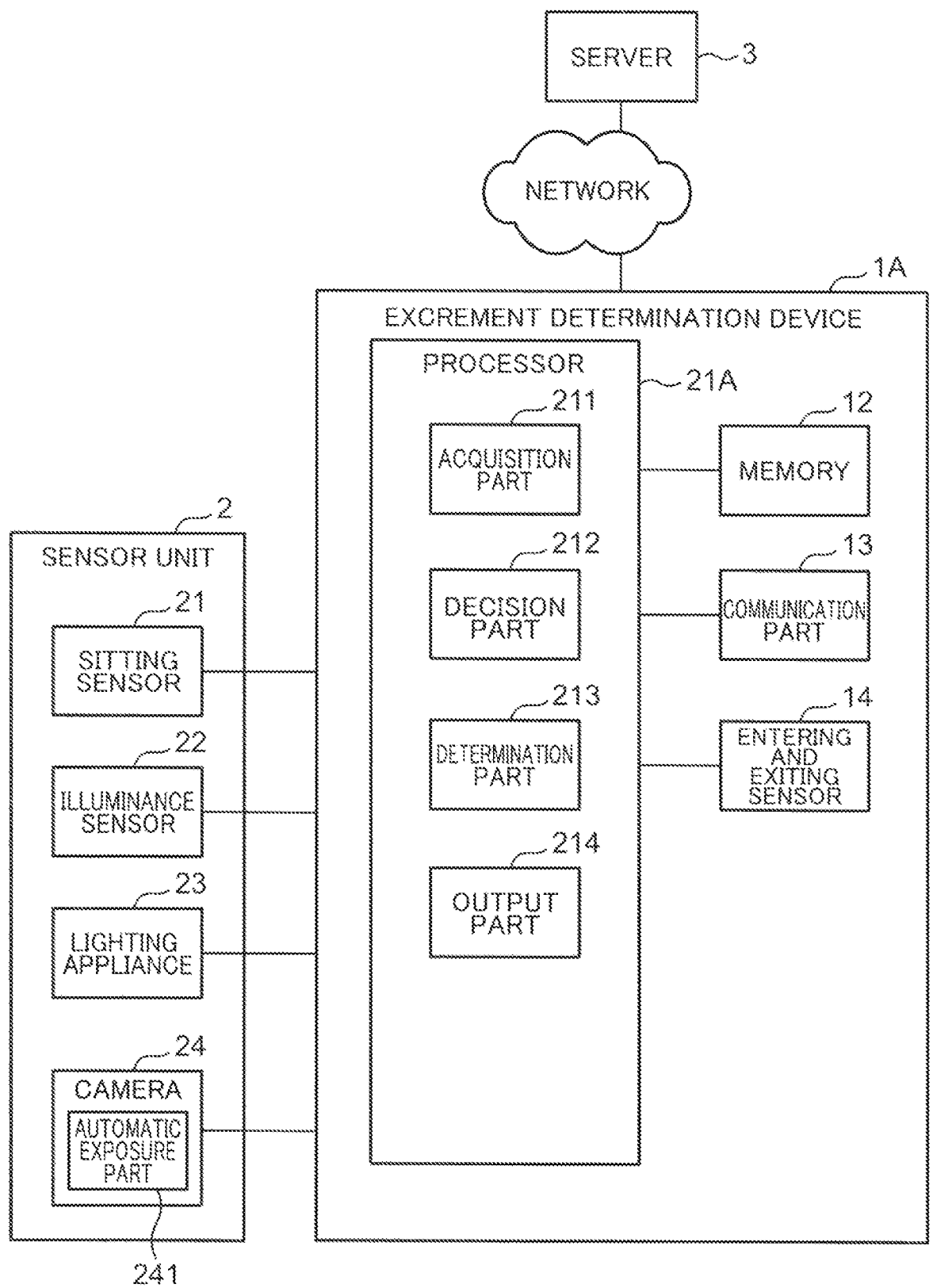
FIG. 8 is a block diagram showing an example of a configuration of an excrement determination system in a second embodiment.

A second embodiment aims at invalidating image data when the pixel number of an object detected from the image data drastically changes. FIG. 8 is a block diagram showing an example of a configuration of an excrement determination system in the second embodiment of the disclosure. In the second embodiment, constituent elements which are the same as those in the first embodiment are given the same reference numerals and signs, and thus explanation therefor will be omitted.

An excrement determination device 1A includes a processor 21A. The processor 21A has an acquisition part 211, a decision part 212, a determination part 213, and an output part 214. The acquisition part 211, the determination part 213, and the output part 214 are respectively equivalent to the first acquisition part 111, the decision part 113, the determination part 114, and the output part 115 shown in FIG. 1.

The decision part 212 detects a predetermined object from image data, and invalidates the image data when a predetermined condition (hereinafter, referred to as "invalidation condition") that a pixel number of the detected object drastically changes is satisfied. The invalidation condition will be described later. The predetermined object includes at least one of urine, feces, and blood.

Next, a process by the excrement determination device 1A in the second embodiment will be described. A main routine of the excrement determination device 1A is equivalent to that shown in FIG. 4. Moreover, the excrement determination device 1A performs the same excrement detection as that shown in FIG. 7. The excrement determination device 1A differs from the excrement determination device 1 in invalidation determination. Hence, the invalidation determination will be described below.

Figure 9:
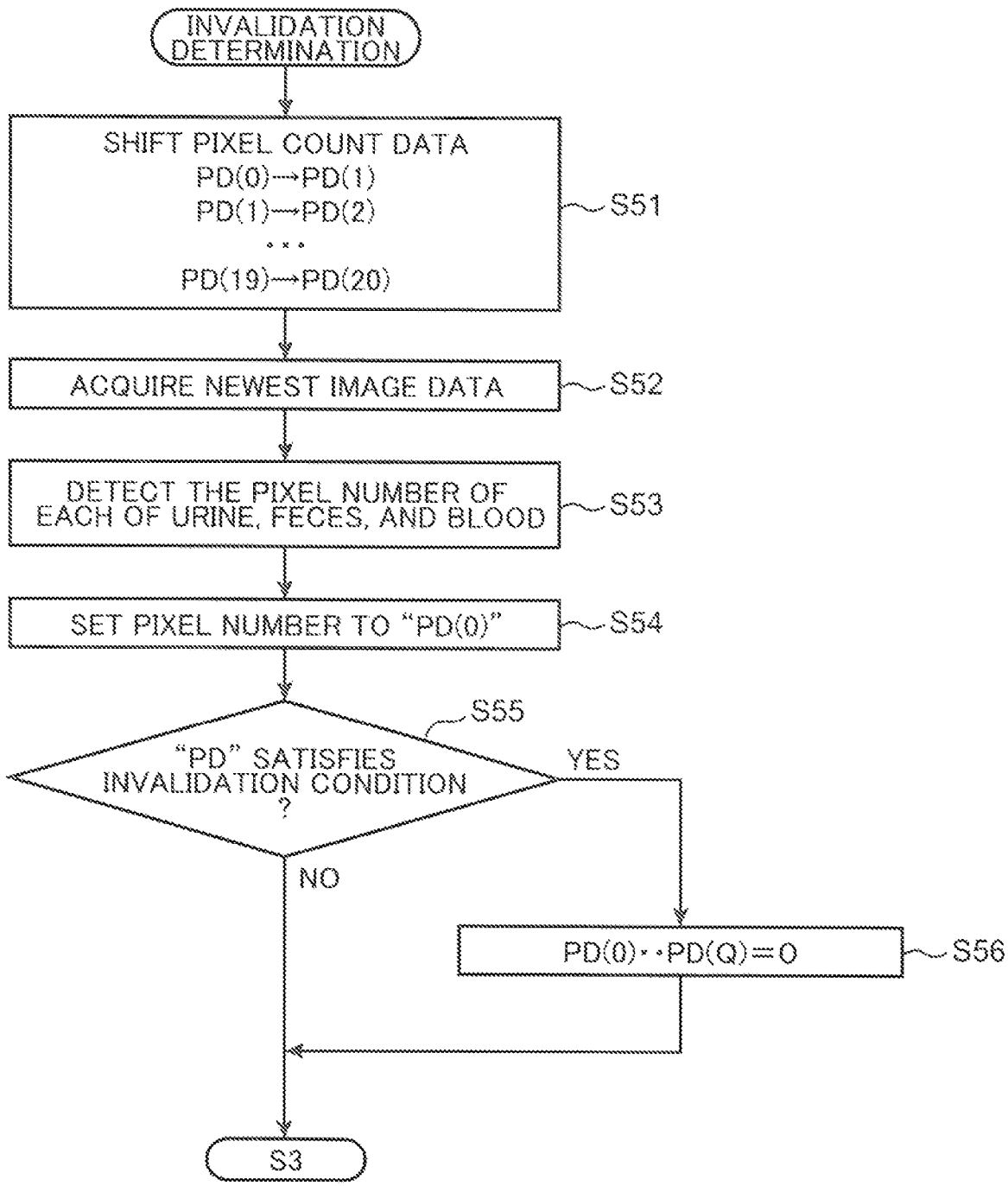
FIG. 9 is a flowchart showing an example of invalidation determination in the second embodiment.

FIG. 9 is a flowchart showing an example of the invalidation determination in the second embodiment. In step S51, the decision part 212 shifts pixel count data PD. Specifically, the decision part 212 sets pixel count data PD(1) to PD(20) in such a manner as to define pixel count data PD(0) as pixel count data PD(1), define pixel count data PD(1) as pixel count data PD(2), . . . and define pixel count data PD(19) as pixel count data PD(20).

In step S52, the decision part 212 acquires the newest image data.

In step S53, the decision part 212 detects the pixel number of each of urine, feces, and blood from the newest image data. The decision part 212 here extracts a detection area D1 from the newest image data, and detects the pixel number of the urine in the extracted detection area D1 by counting pixels of data falling within a predetermined RGB-range indicating urine. The decision part 212 further detects the pixel number of the feces in the extracted detection area D1 of the newest image data by counting pixels of data falling within a predetermined RGB-range indicating feces. In addition, the decision part 212 detects the pixel number of the blood in the extracted detection area D1 of the newest image data by counting pixels of data falling within a predetermined RGB-range indicating blood.

In step S54, the decision part 212 sets the pixel number of each of the urine, the feces, and the blood detected from the newest image data to the pixel count data PD(0).

In step S55, the decision part 212 determines whether the pixel count data PD satisfies an invalidation condition. The invalidation condition here includes a condition that the inequality "|PD(0)|>|PD(−1)|×P1" is satisfied and at least one piece of pixel count data PD(k) in a period (Q×T) satisfies the inequality "|PD(k)|<|PD(k−1)|×P2".

The sign "k" denotes an integer equal to or smaller than −1. The parameter "P1" can take an appropriate value of 5, 6, 7, or the like. The parameter "P2" is smaller than P1 and can take an appropriate value of 2, 3, 4, or the like. The parameter "Q" takes an appropriate value, e.g., 3, 4, or 5. The sign "T" denotes a sampling cycle. The decision part 212 may determine "YES" in step S55 when the pixel count data PD of at least one of the urine, the feces, and the blood satisfies the invalidation condition. Alternatively, the decision part 212 may adopt a total value about the urine, the feces, and the blood as the pixel count data PD.

The processing proceeds to step S56 when the pixel count data PD satisfies the invalidation condition (YES in step S55), and the processing proceeds to step S3 (FIG. 4) when the pixel count data PD dissatisfies the invalidation condition (NO in step S55).

In step S56, the decision part 212 sets "PD(0), PD(−1), . . . PD(Q)=0". In this manner, the image data at sampling points (t), (t−1) . . . . , (t−Q) is invalidated. For instance, in the case of Q=3, four pieces of image data corresponding to the pixel count data PD(0), PD(−4), PD(−2), and PD(−3) are invalidated. When the step S56 is finished, the processing proceeds to step S3 (FIG. 4).

Figure 10:
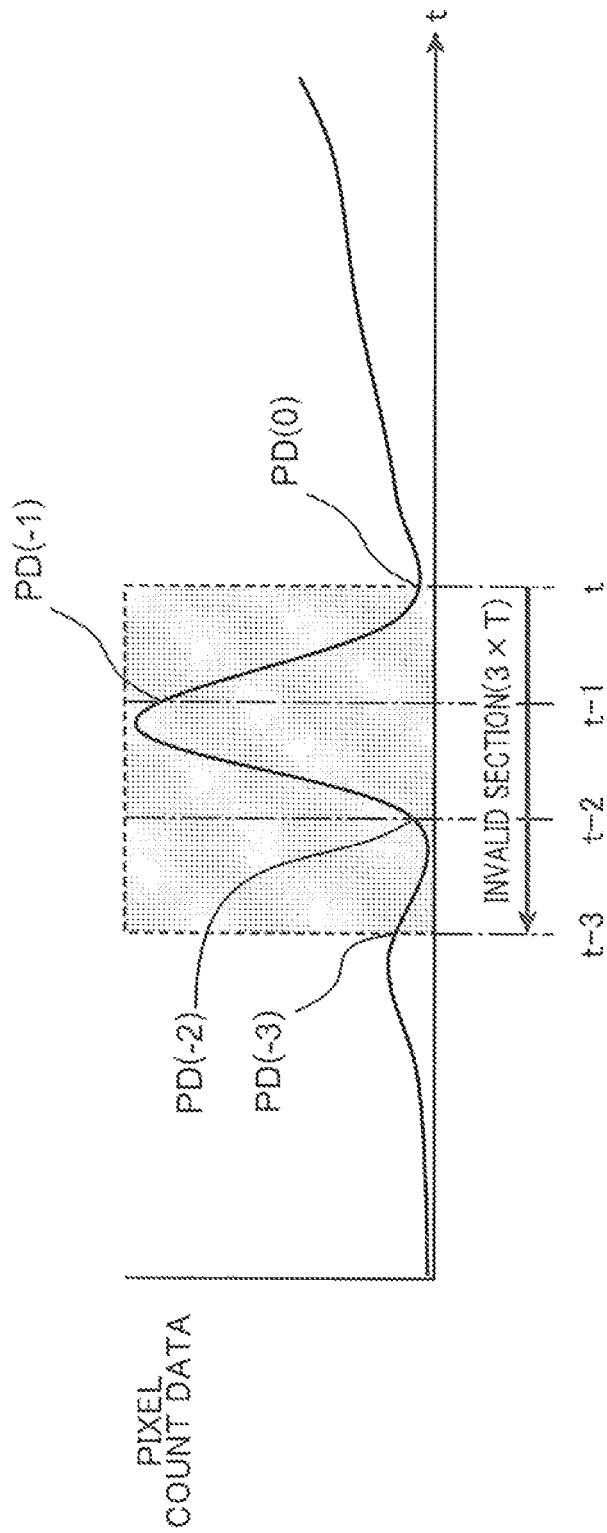
FIG. 10 is an explanatory view of the invalidation determination in the second embodiment.

FIG. 10 is an explanatory view of the invalidation determination in the second embodiment. The example shows the inequality "|PD(0)|>|PD(−1)|×P1." The example further shows the inequality "|PD(−2)|<|PD(−3)|×P2." It is seen from these perspectives that the pixel count data PD satisfies the invalidation condition. Consequently, a period from the sampling point (0) to the sampling point (t−3) is set to an invalidation section.

When the sitting state changes in re-sitting onto the toilet or opening legs to wipe off excrement, external light entering the bowl drastically changes. A change in an amount of the light results in a change in the pixel count data PD.

Here, when the predetermined condition that the pixel count data PD drastically changes is satisfied, the decision part 212 determines the image data in the drastic change as invalid. In this manner, excrement detection is not applied to the image data captured in the period of the drastic change in the external light entering the bowl. This results in preventing misrecognition of excrement in an occurrence of a change in the sitting state of the user sitting on the toilet 100.

The invalidation condition may include a condition that the inequality "PD(0)>PD(−1)×P1" is satisfied and at least one piece of PD(k) in the period (Q×T) satisfies the inequality "PD(k)<PD(k−1)×P2".

The invalidation condition may include a condition that the period (Q×T) includes a section in which the pixel count data PD increases in a slope of a predetermined increase rate or higher and a section in which the pixel count data PD decreases in a slope of a predetermined decrease rate.

Third Embodiment

Figure 11:
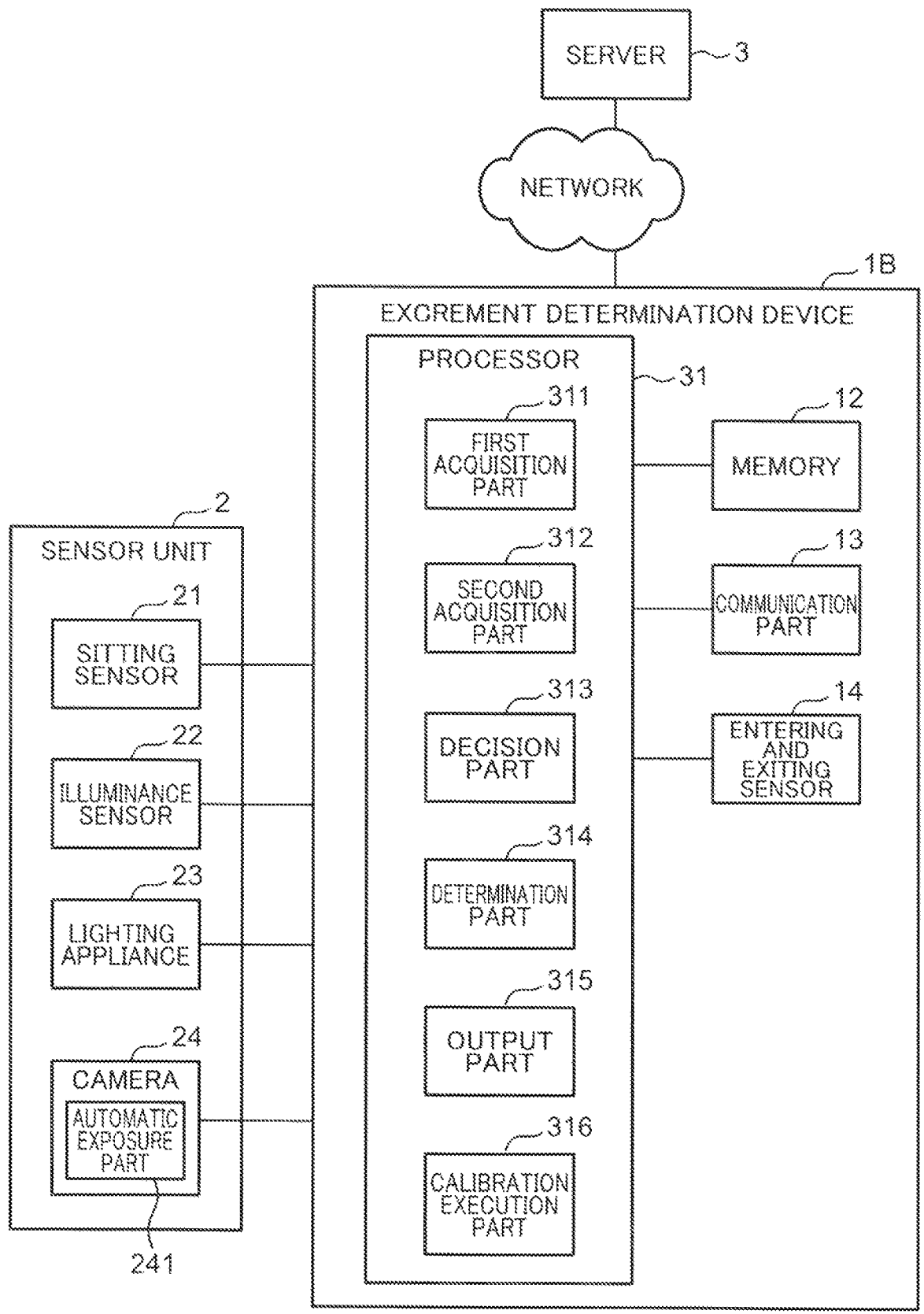
FIG. 11 is a block diagram showing an example of a configuration of an excrement determination system in a third embodiment.

A third embodiment aims at executing processing of calibration of a reference toilet color. FIG. 11 is a block diagram showing an example of a configuration of an excrement determination system in the third embodiment. In the third embodiment, elements which are the same as those in the first and second embodiments are given the same reference numerals and signs, and thus explanation therefor will be omitted.

A processor 31 included in an excrement determination device 1B has a first acquisition part 311, a second acquisition part 312, a decision part 313, a determination part 314, an output part 315, and a calibration execution part 316. The first acquisition part 311 to the output part 315 are respectively equivalent to the first acquisition part 111 to the output part 115 shown in FIG. 1.

The calibration execution part 316 executes calibration for determining a reference toilet color.

Figure 12:
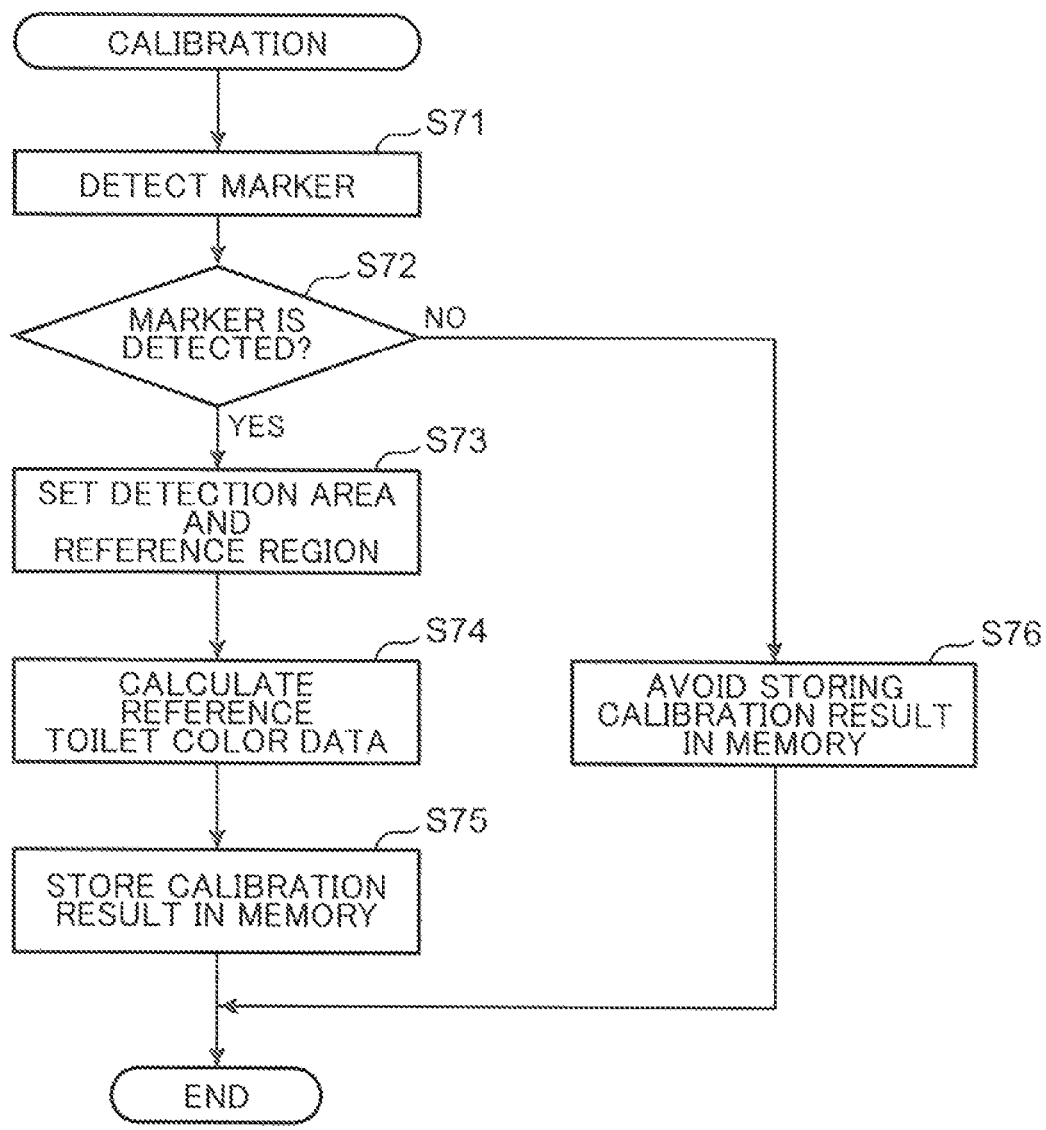
FIG. 12 is a flowchart showing an example of calibration.

FIG. 12 is a flowchart showing an example of the calibration.

Figure 13:
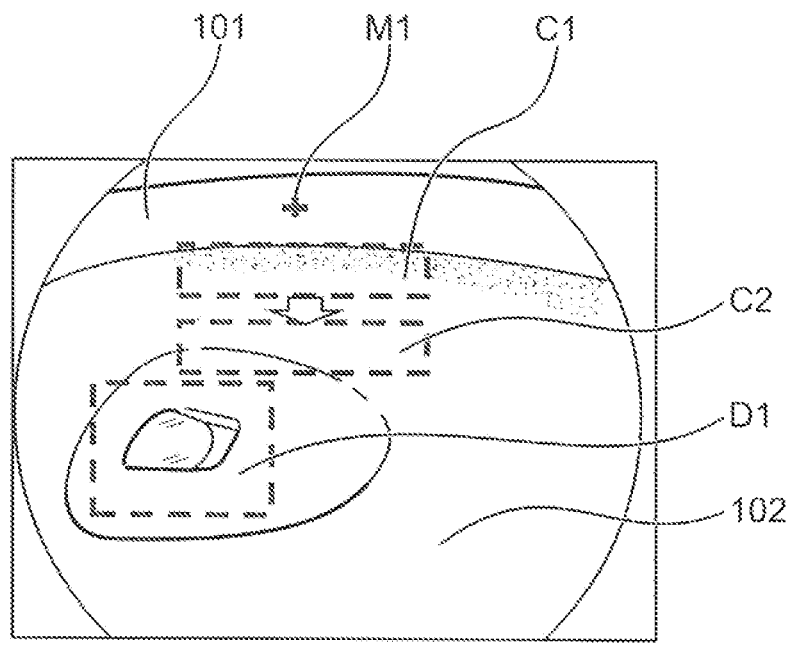
FIG. 13 is an explanatory view of the calibration.

In step S71, the calibration execution part 316 acquires image data captured by a camera 24, and detects a marker by applying, for example, pattern matching, to the acquired image data. FIG. 13 is an explanatory view of the calibration. A marker M1 is located at a predetermined position of a fringe part 101 of a toilet 100. The marker M1 represents a marker for setting a detection area D1 and a reference region C2 in the image data.

In step S72, the calibration execution part 316 determines whether the marker M1 is detected. The processing proceeds to step S73 when the marker M1 is detected (YES in step S72), and the processing proceeds to step S76 when the marker M1 is not detected (No in step S72).

In step S73, the calibration execution part 316 sets the detection area D1 and the reference region C2 in the image data. Here, setting information for specifying, on the basis of the marker M1, a coordinate in the image data for each of the detection area D1 and the reference region C2 is predetermined. The calibration execution part 316 may therefore set the detection area D1 and the reference region C2 onto the image data in accordance with the setting information based on the marker M1. The detection area D1 denotes a rectangular area containing a pool part 104. The reference region C2 is at a predetermined distance away from a fringe part 101 toward the pool part 104, and denotes a rectangular region in a bowl 102 excluding the pool part 104.

In step S74, the calibration execution part 316 calculates toilet reference color data from the reference region C2. The toilet reference color data has an average value of each of R, G, B values of each pixel data constituting the reference region C2.

In step S75, the calibration execution part 316 stores a result of the calibration in a memory 12. The result of the calibration includes the set coordinate of a vertex of the detection area D1, the set coordinate of a vertex of the reference region C2, and the reference toilet color data.

It is seen from FIG. 13 that a region located in the bowl 102 and just below the fringe part 101 has been conventionally set as a reference region C1. Such a portion located just below the fringe part 101 is difficult to clean, and thus, a stain is hard to remove. In this respect, calculation of reference toilet color data from the reference region C1 may fail to reach reference toilet color data correctly indicating the color of the bowl 102 due to the influence of the stain. The calibration execution part 316 calculates reference color data from the reference region C2 to avoid the failure.

In step S76, the calibration execution part 316 finishes the calibration without storing the result of the calibration in the memory 12.

Conclusively, the excrement determination device 1B in the third embodiment achieves calculation of appropriate reference toilet color data.

This disclosure can adopt modifications described below.

(1) The excrement determination device 1 may further execute the invalidation determination described in the second embodiment in addition to the invalidation determination described in the first embodiment. In this case, the processing may proceed to step S51 in FIG. 9 when step S41 in FIG. 5 shows "NO". For instance, the invalidation determination in the first embodiment is effective to detect a change in a sitting state due to re-sitting. By contrast, the invalidation determination in the second embodiment is effective to detect a change in a sitting state due to opening of legs by a sitting user. It is seen from these perspectives that the combination of the first embodiment and the second embodiment attains detection of a change in the sitting state due to the re-sitting and a change in the sitting state due to opening of legs.

(2) Although invalidation or validation of image data is decided by using a distance value from the sitting sensor 21 in the flowchart shown in FIG. 5, the invalidation or validation of the image data may be decided by using an illuminance value detected by the illuminance sensor 22. In this case, in step S32, the sign "Sf(0)" denotes an illuminance value at a sampling point (0), and the sign "SD(−1)" denotes an illuminance value at a sampling point (t−1). The sitting detection threshold A2 in step S41 takes a predetermined illuminance value indicating leaving of a user from the toilet 100.

(3) The calibration described in the third embodiment may be applied to the second embodiment.

INDUSTRIAL APPLICABILITY

An excrement determination device in the present disclosure is useful in a technology of determining an occurrence of excretion from image data.

The invention claimed is:

1. An excrement determination method for an excrement determination device that determines the occurrence of at least one of defecation and urination in a toilet by a user of the toilet, the excrement determination method being performed by a processor included in the excrement determination device and comprising:
    acquiring image data captured by a camera which is located at the toilet provided in a toilet room to photograph a bowl of the toilet;
    acquiring sensing data from a sensor that detects sitting and leaving of a user onto and from the toilet;
    determining whether to validate or invalidate the image data on the basis of a change in the sensing data;
    determining, on the basis of image data determined to be valid, an occurrence of at least one of defecation and urination by the user; and
    outputting a result of the validating determination, wherein,
    in the validating-determining operation, the leaving of the user from the toilet is determined when the sensing data continuously indicates the leaving of the user from the toilet for a first period.

2. The excrement determination method according to claim 1, wherein, in the validating-determining operation, the image data is invalidated when the change in the sensing data is beyond a predetermined range after the sensing data indicates the sitting of the user on the toilet.

3. The excrement determination method according to claim 2, wherein, in the validating-determining operation, when the change in the sensing data continuously falls within the predetermined range for a second period after the sending data indicates the sitting of the user on the toilet, at least image data captured in the second period is invalidated.

4. The excrement determination method according to claim 2, wherein, in the validating-determining operation, the sitting of the user on the toilet is determined to occur when the change in the sensing data continuously falls within the predetermined range for the second period after the sensing data indicates the sitting of the user on the toilet.

5. The excrement determination method according to claim 4, wherein, in the validating-determining operation, the image data is invalidated when the change in the sensing data is beyond the predetermined range after determining that the user sits on the toilet.

6. The excrement determination method according to claim 1, wherein the sensing data includes a distance value from a distance measurement sensor or an illuminance value from an illuminance sensor.

7. The excrement determination method according to claim 1, wherein, in the occurrence-determining operation, the occurrence of at least one of the defecation and the urination is determined by using valid image data in a predetermined period before a newest image is obtained from the camera.

8. The excrement determination method according to claim 1, wherein,
    in the occurrence determining operation, the occurrence of at least one of the defecation and the urination is determined by comparing the image data captured by the camera with reference toilet color data, and
    the reference toilet color data is calculated on the basis of color data of a region in the bowl, the region being at a predetermined distance away from a fringe of the toilet toward a pool part of the toilet.

9. A non-transitory computer-readable recording medium storing an excrement determination program causing a computer to execute the excretion determination method according to claim 1.

10. An excrement determination device that determines the occurrence of at least one of defecation and urination in a toilet by a user of the toilet, comprising:

a first acquisition part that acquires image data captured by a camera which is located at the toilet provided in a toilet room to photograph a bowl of the toilet;

a second acquisition part that acquires sensing data from a sensor that detects sitting and leaving of a user onto and from the toilet;

a first determination part that determines whether to validate or invalidate the image data on the basis of a change in the sensing data;

a second determination part that determines, on the basis of image data determined to be valid, the occurrence of at least one of defecation and urination by the user; and an output part that outputs a result of the second determination, wherein the first determination part determines the leaving of the user from the toilet when the sensing data continuously indicates the leaving of the user from the toilet for a first period.

11. An excrement determination method for an excrement determination device that determines the occurrence of at least one of defecation and urination in a toilet by a user of the toilet, the excrement determination method being performed by a processor included in the excrement determination device and comprising:

acquiring image data captured by a camera which is located at the toilet provided in a toilet room to photograph a bowl of the toilet;

determining whether to validate or invalidate the image data on the basis of a change in the image data;

determining, on the basis of image data determined to be valid, the occurrence of at least one of defecation and urination; and outputting a result of the occurrence determination, wherein in the validity-determining operation, a predetermined object is detected from the image data, and the image data is invalidated when the detected object satisfies a predetermined condition that a pixel number of the object changes, and the predetermined condition includes a condition that the pixel number of the object increases at a predetermined increase rate or higher, and decreases at a predetermined decrease rate or higher.

12. The excrement determination method according to claim 11, wherein the predetermined condition includes a condition that: a pixel number at a t-th sampling point is larger than a value which is P1-times larger than a pixel number at a (t−1)-th sampling point; and a pixel number at a k-th sampling point being at least one sampling point in a predetermined past period from the t-th sampling point is smaller than a value which is P2-times larger than a pixel number at a (k−1)-th sampling point, wherein t is a positive integer, k is equal to or smaller than t−1, and P2 is smaller than P1.

13. The excrement determination method according to claim 11, wherein the predetermined object includes at least one of urine, feces, and blood.

14. The excrement determination method according to claim 11, wherein, in the occurrence determining operation, the occurrence of at least one of the defecation and the urination is determined by using valid image data in a predetermined period before a newest image is obtained from the camera.

15. The excrement determination method according to claim 11, wherein, in the occurrence determining, the occurrence of at least one of the defecation and the urination is determined by comparing the image data captured by the camera with reference toilet color data, and the reference toilet color data is calculated on the basis of color data of a region in the bowl, the region being at a predetermined distance away from a fringe of the bowl toward a pool part.

16. A non-transitory computer-readable recording medium storing an excrement determination program causing a computer to execute the excrement determination method according to claim 11.

17. An excrement determination device that determines the occurrence of at least one of defecation and urination in a toilet by a user of the toilet, comprising:

an acquisition part that acquires image data captured by a camera which is located at the toilet provided in a toilet room to photograph a bowl of the toilet;

a first determining part that determines whether to validate or invalidate the image data on the basis of a change in the image data;

a second determination part that determines, on the basis image data determined to be valid, the occurrence of at least one of defecation and urination; and an output part that outputs a result of the second determination, wherein in the first determining part, a predetermined object is detected from the image data, and the image data is invalidated when the detected object satisfies a predetermined condition that a pixel number of the object changes, and the predetermined condition includes a condition that the pixel number of the object increases at a predetermined increase rate or higher, and decreases at a predetermined decrease rate or higher.

* * * * *